US007494411B2

(12) United States Patent
Baerlocher

(10) Patent No.: US 7,494,411 B2
(45) Date of Patent: Feb. 24, 2009

(54) GAMING DEVICE HAVING TEASE REVEAL FEATURE

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 694 days.

(21) Appl. No.: 11/009,733

(22) Filed: Dec. 9, 2004

(65) Prior Publication Data

US 2005/0101377 A1 May 12, 2005

Related U.S. Application Data

(63) Continuation of application No. 10/623,268, filed on Jul. 18, 2003, now Pat. No. 6,832,959, which is a continuation of application No. 09/957,583, filed on Sep. 20, 2001, now Pat. No. 6,605,002.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/16; 463/17; 463/18; 463/19; 463/20; 463/21; 463/25; 463/41; 463/42; 463/43

(58) Field of Classification Search ............. 463/16–21, 463/25, 41–43
See application file for complete search history.

(56) References Cited

U.S. PATENT DOCUMENTS 4,448,419 A 5/1984 Telnaes
4,695,053 A 9/1987 Vazquez, Jr. et al.
5,205,555 A 4/1993 Humano
5,397,125 A 3/1995 Adams
5,449,173 A 9/1995 Thomas et al.
5,611,535 A 3/1997 Tiberio
5,766,074 A 6/1998 Cannon et al.
5,788,573 A 8/1998 Baerlocher et al.
5,823,874 A 10/1998 Adams
5,902,184 A 5/1999 Bennett et al.
5,919,088 A 7/1999 Weiss
6,004,207 A 12/1999 Wilson, Jr. et al.

(Continued)

FOREIGN PATENT DOCUMENTS

EP 0945837 A2 * 9/1999

OTHER PUBLICATIONS

"Creepy and Kooky", StrictlySlots.com, Aug. 18, 2000, http://www.strictlyslots.com/archive/0007ss/html/indepth.html.*

(Continued)

*Primary Examiner*—Robert E Pezzuto
*Assistant Examiner*—Jason Pinheiro
(74) *Attorney, Agent, or Firm*—Bell, Boyd & Lloyd LLP

(57) ABSTRACT

An apparatus and method for at least partially revealing a first award on a display device of the gaming device, unrevealing the first award, and at least partially revealing a second award on the display device. The first award is stored in and randomly chosen from a first table and the second award is randomly chosen from a second table. The game includes a plurality of methods or mechanisms with which to unreveal or not display the first revealed award.

56 Claims, 11 Drawing Sheets

U.S. PATENT DOCUMENTS

| | | | |
|---|---|---|---|
| 6,015,346 | A | 1/2000 | Bennett |
| 6,033,307 | A | 3/2000 | Vancura |
| 6,089,976 | A | 7/2000 | Schneider et al. |
| 6,102,798 | A | 8/2000 | Bennett |
| 6,126,542 | A | 10/2000 | Fier |
| 6,159,095 | A | 12/2000 | Frohm et al. |
| 6,159,097 | A | 12/2000 | Gura |
| 6,159,098 | A | 12/2000 | Slomiany et al. |
| 6,174,233 | B1 | 1/2001 | Sunaga et al. |
| 6,174,235 | B1 | 1/2001 | Walker et al. |
| 6,190,255 | B1 | 2/2001 | Thomas et al. |
| 6,224,482 | B1 | 5/2001 | Bennett |
| 6,224,483 | B1 | 5/2001 | Mayeroff |
| 6,231,445 | B1 | 5/2001 | Acres |
| 6,290,600 | B1 | 9/2001 | Glasson |
| 6,328,649 | B1 | 12/2001 | Randall et al. |
| 6,346,043 | B1 | 2/2002 | Colin et al. |
| 6,347,996 | B1 | 2/2002 | Gilmore et al. |
| 6,364,766 | B1 | 4/2002 | Anderson et al. |
| 6,443,837 | B1 | 9/2002 | Jaffe et al. |

OTHER PUBLICATIONS

Texas Tea Advertisement written by IGT, published in 2000.

Winning Bid Advertisement written by WMS Gaming, Inc., published prior to 2000.

Top Dollar Advertisement written by IGT, published in 1998.

Slot Line Article including Mega Bucks big Check written by IGT, published in 1999.

Instant Winner Advertisement written by WMS Gaming Inc., available prior to 2001.

* cited by examiner

FIG.8A

150

152 154

| REPLACE | % NO REPLACE |
|---|---|
| 1 | 10% |
| 2 | 25% |
| 3 | 30% |
| 4 | 35% |

FIG.8B 152 162 160

164

| REPLACE | COLLECT % | CONTINUE % |
|---|---|---|
| 1 | 10% | 90% |
| 2 | 28% | 72% |
| 3 | 42% | 58% |
| 4 | 100% | 0% |

FIG.10

182 184 180

186

| PARTITION | % WILL REVEAL | % OF AWARD TO REVEAL |
|---|---|---|
| 1 | 80% | 20% |
| 2 | 70% | 35% |
| 3 | 60% | 55% |
| 4 | 75% | 80% |

FIG.9

172 174 170 176

| | | |
|---|---|---|
| INITIAL AWARD | 2 | 10% |
| | 5 | 25% |
| | 10 | 35% |
| | 15 | 30% |
| AWARD FOR FIRST REPLACEMENT | 20 | 20% |
| | 22 | 25% |
| | 25 | 25% |
| | 30 | 30% |
| AWARD FOR SECOND REPLACEMENT | 35 | 25% |
| | 40 | 25% |
| | 42 | 25% |
| | 45 | 25% |
| AWARD FOR THIRD REPLACEMENT | 50 | 10% |
| | 52 | 40% |
| | 55 | 40% |
| | 60 | 10% |
| AWARD FOR FOURTH REPLACEMENT | 65 | 30% |
| | 70 | 35% |
| | 72 | 30% |
| | 80 | 15% |

GAMING DEVICE HAVING TEASE REVEAL FEATURE

PRIORITY CLAIM

This application is a continuation of and claims the benefit of U.S. patent application Ser. No. 10/623,268 filed Jul. 18, 2003 now U.S. Pat. No. 6,832,959, which is a continuation of and claims the benefit of U.S. patent application Ser. No. 09/957,583 filed Sep. 20, 2001, now U.S. Pat. No. 6,605,002.

CROSS REFERENCE TO RELATED APPLICATIONS

The present invention relates to the following co-pending commonly owned U.S. patent application: "GAMING DEVICE HAVING BONUS SCHEME WITH INCREMENTAL VALUE DISCLOSURE," Ser. No. 09/627,198, now U.S. Pat. No. 6,582,306; and "GAMING DEVICE HAVING INCREMENTAL VALUE DISCLOSURE," Ser. No. 10/447,779, now U.S. Pat. No. 6,811,488.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having an apparatus and method for revealing or partially revealing an award, removing or unrevealing the award and revealing another award, before finally providing an award to a player.

BACKGROUND OF THE INVENTION

Gaming devices are generally designed for the entertainment and enjoyment of players. Additionally, gaming devices provide an opportunity for players to win money, although players understand that they must risk money for such opportunities. Most gaming devices at least intermittently if not frequently generate a win for the player. When the player wins, the player experiences enjoyment or perhaps relief, and in most cases, the player is excited and entertained. Many gaming devices now provide bonus games in addition to the base slot, poker, blackjack, etc., game. In bonus games, the question is usually not whether the player wins, but how much the player wins. Many slot machines include progressive games, in which large jackpots build from a percentage taken from the players' wagers. The hit or win frequency of progressive games is very low, but when players do win, they obtain the large jackpots.

It should be appreciated that winning and providing awards is a vital aspect to gaming, and that gaming device manufacturers attempt to maximize the entertainment value of a gaming device win. Gaming establishments, too, tend to place higher hit frequency gaming devices in more visible areas.

One known method for maximizing the enjoyment and excitement associated with the outcome of a bonus round is to reveal unselected award opportunities after the game has advanced to a stage wherein the opportunity no longer exists.

European Patent Application No. EP 0 945 837 A2 filed on Mar. 18, 1999 and assigned on its face to WMS Gaming, Inc. discloses a bonus game in which a player has one or more opportunities to select masked bonus awards. When the player selects a masked award, the game reveals the selection and provides the award to the player. The player selects until selecting a game terminator, at which time the game reveals all unselected masked awards.

Another known method for maximizing the enjoyment and excitement associated with the outcome of a bonus round includes displaying all possible awards or outcomes and enabling players to accept or decline multiple award offers. The TOP DOLLAR™ gaming device, which is manufactured and distributed by the assignee of this application, provides the player with three offers and a final award. When an offer is given, the player may accept or reject it. If the player accepts an offer, the player receives the accepted bonus amount and the bonus round terminates. If the player declines an offer, the game generates another offer for the player, which may be a higher or lower award. The game thus creates a risk for the player, wherein the risk is demonstrated to the player by displaying the possible awards.

In both examples, the game maximizes the enjoyment and excitement associated with an outcome after the game has provided an award or an offer to the player. Once a game provides an award to a player, the game, by regulation, cannot remove or take away the provided award, without the player first choosing to do so, e.g., in an offer/acceptance such as in the TOP DOLLAR™ gaming device. However, before providing an award to a player, the game can provide and take away awards as desired by the implementer, e.g., provide different awards on a spinning wheel and point to the player's award.

SUMMARY OF THE INVENTION

The present invention provides a gaming device which at least partially reveals, displays or provides a first award on a display device, unreveals or removes the at least partially revealed award and then at least partially, reveals, displays or provides a second award on the display device in place of the first award. The present invention includes a display device, a first award stored in, and randomly chosen from a first paytable, which the game at least partially reveals on the display device. The game includes a plurality of methods or mechanisms with which to unreveal or not display the first revealed award. The gaming device also includes at least one other award stored in, and randomly chosen from a second paytable, which the game at least partially reveals on the display device.

The present invention preferably includes a plurality of these unrevealings or unrevealed awards from the display device. The gaming device preferably includes a database adapted to enable a processor or computer of the game to determine the number of unrevealings or unrevealed awards, which preferably occur sequentially. The game provides a final award, which is revealed and not unrevealed, to a player. The revealed awards preferably increase as the game reveals, unreveals and re-reveals. The gaming device also includes an indicator of awards provided to the player, which does not show an award provided to the player until the game has finished unrevealing awards.

The revealed awards of one embodiment of the present invention include Arabic numbers or written out or scripted numbers. The methods by which the game unreveals the revealed awards include discontinuing the display of, covering or distorting the revealed awards. The mechanisms with which the gaming devices uses to unreveal awards include providing a video clip or an animation on the display device, which performs one of the above mentioned methods.

It is therefore an advantage of the present invention to include on a gaming device an apparatus and method for revealing or partially revealing an award, removing or unrevealing the award and revealing another award, before finally providing an award to a player.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 8A and 8B are tables illustrating different reveal database embodiments of the present invention;

FIG. 9 is a table illustrating one award database embodiment of the present invention, which includes a separate paytable for each replacement award; and FIG. 10 is a table illustrating one award partition database embodiment of the present invention.

DETAILED DESCRIPTION OF THE INVENTION

Gaming Device and Electronics

Figure 1A:
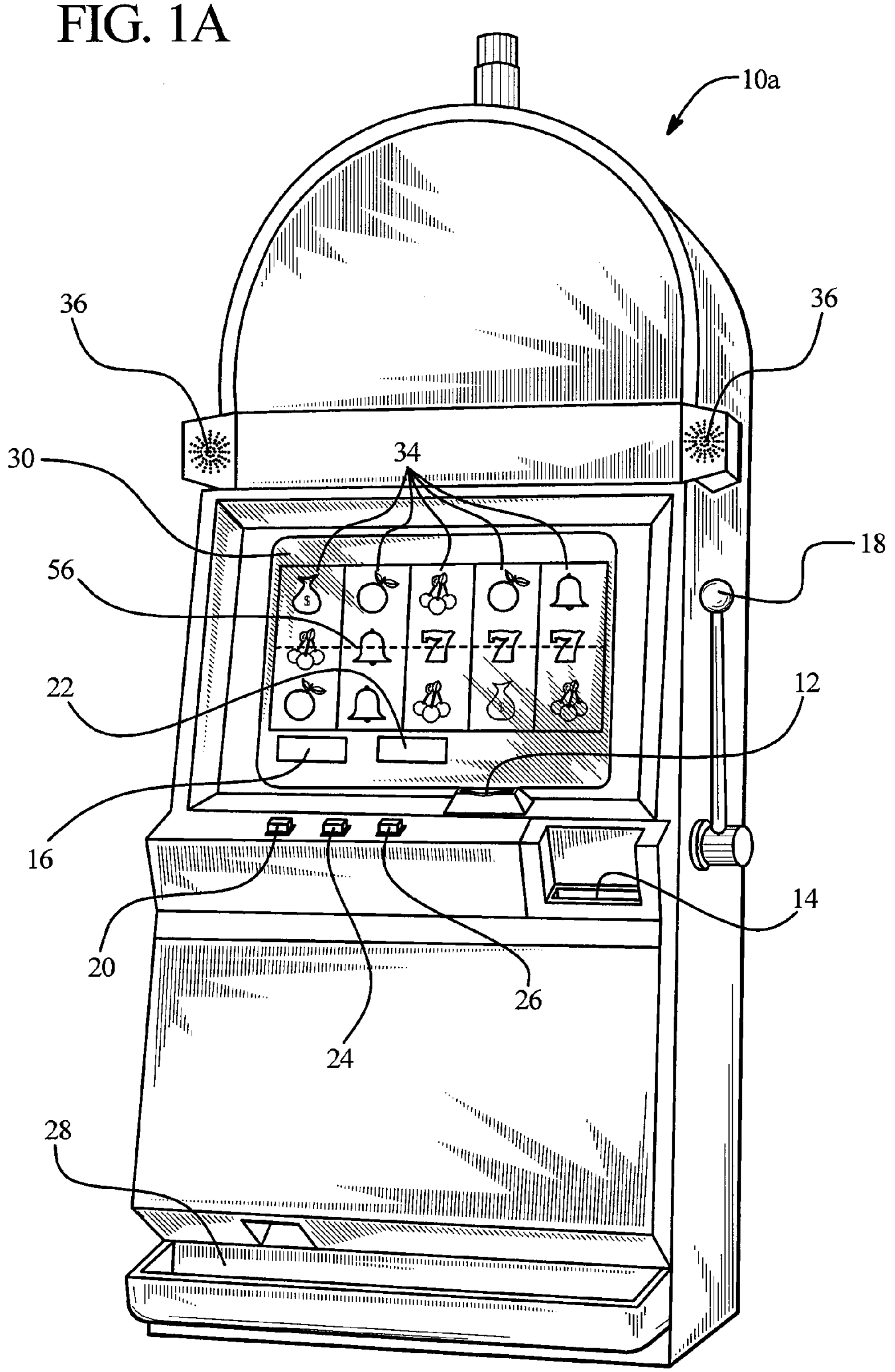
FIG. 1A is a front-side perspective view of one embodiment of the gaming device of the present invention.
Figure 1B:
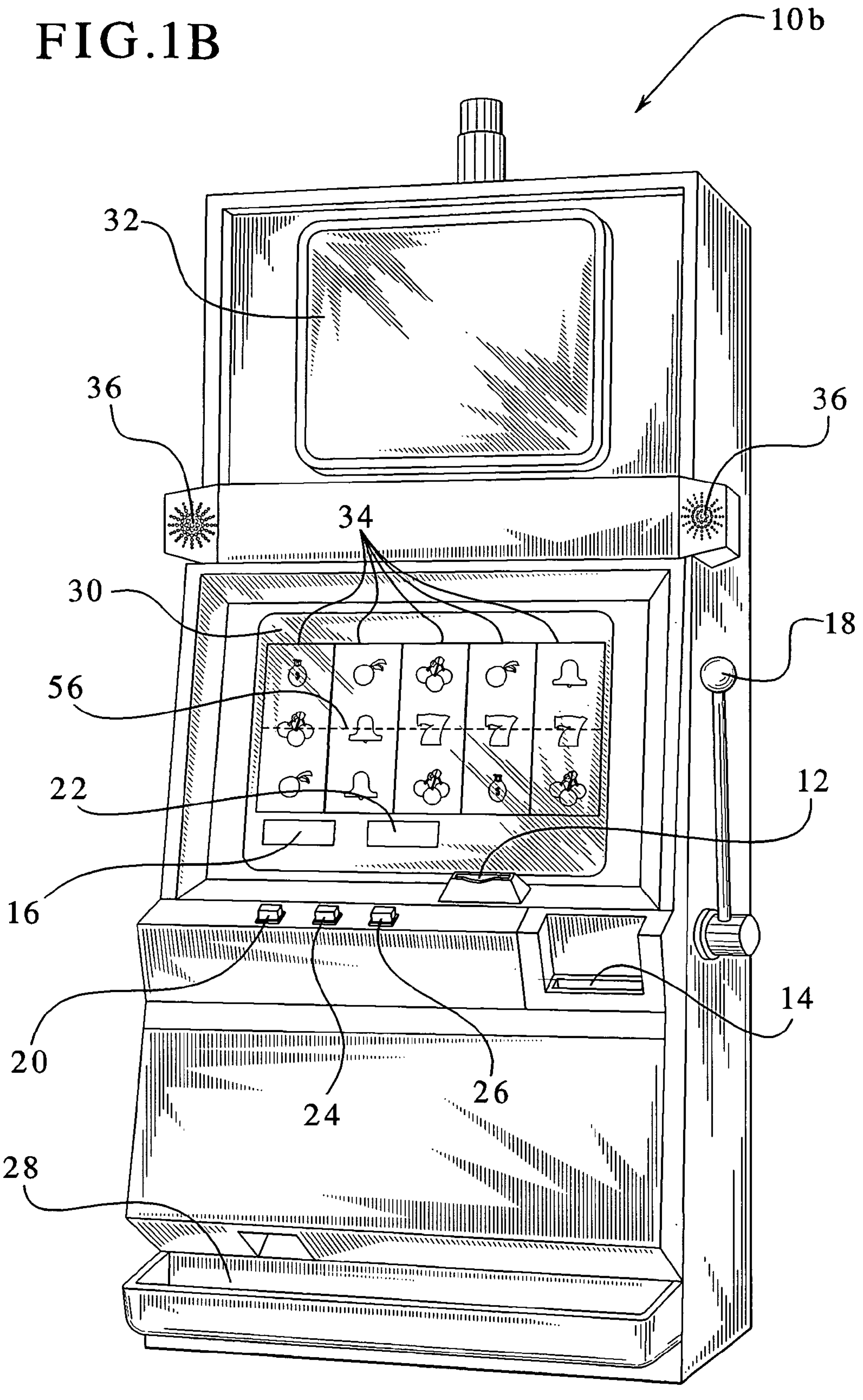
FIG. 1B is a front-side perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit cards, debit cards or smart cards. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, and preferably in the slot machine embodiment of the gaming device 10, includes speakers 36 for making sounds or playing music.

Figure 2:
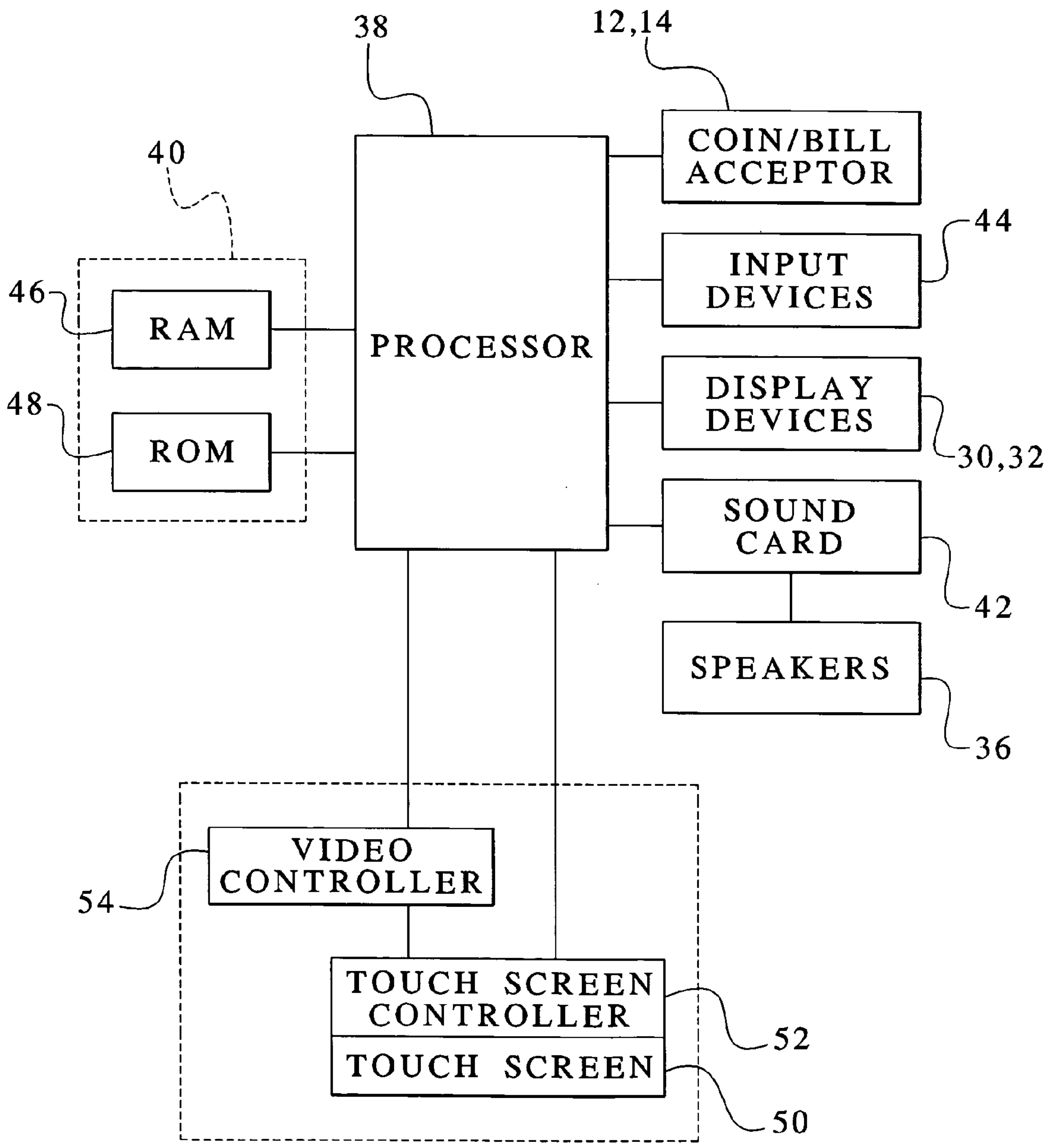
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or the "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. A player can make decisions and input signals into the gaming device 10 by touching touch screen 50 at the appropriate places. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming the device 10, the player inserts the appropriate amount of money or tokens at coin slot 12 or bill acceptor 14 and then pulls the arm 18 or pushes the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. Bonus games include a program that automatically begins when the player achieves a qualifying condition in the base game. The gaming device 10 preferably employs a video-based central display device 30 or 32 for the bonus round.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Award Displays and Methods for Unrevealing

Figure 3A:
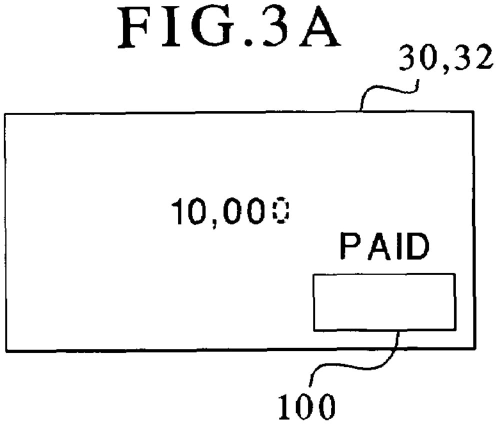
FIGS. 3A through 3D are front plan views of the display devices of FIGS. 1A and 1B, which illustrate one generic numerical embodiment of the present invention.

Referring now to FIGS. 3A through 3D, a numeric award display embodiment is illustrated. In FIG. 3A one of the display devices 30 or 32 displays a portion of the award 10,000 in Arabic numerals. The first four (left to right) numbers, "10,00", are illustrated in solid lines while the remaining number, "0", is illustrated in phantom. The line type differences represent that the game does not fully reveal the "10,000" but instead only reveals the "10,00". The game unreveals or stops displaying the revealed portion before the game can completely reveal the award.

A paid display 100, which is preferably a simulated indicator on the display device 30 or 32 of FIG. 3A, but is alternatively an electromechanical device mounted on the console of gaming device 10, indicates the value of an award paid to a player. The paid display 100 indicates only the value of the current award, which is different from the credit display 16 that shows the recent award plus the player's previous award total. In FIG. 3A it should be appreciated that the game does not actually provide the 10,000 award to the player.

The game preferably reveals an award or an award portion in a way that is exciting and entertaining for the player. In the Arabic number embodiment, for example, the game includes revealing the award, number by number, from left to right. In this way the player sees that the player has a "1" award, then a "10" award, then a "100" awards, etc., i.e., the player sees the award grow. Similarly, the Arabic number embodiment includes displaying the award from right to left, however, the game implementors may refrain from displaying "0", then "00".

To create excitement and enjoyment, the present invention includes clearly revealing at least a portion of the Arabic number awards such that the player is able to discern the revealed values. Alternatively, the present invention includes changing an indiscernible award into a discernable one. For instance, the present invention includes enlarging an indiscernibly small revealed "10,000" until a player can read the numbers. The game preferably employs this type of reveal when the game reveals the entire award.

Figure 3B:
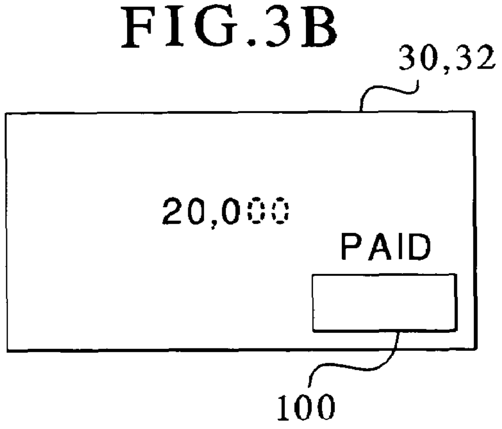

Referring now to FIG. 3B, the game, as illustrated on one of the display devices 30 or 32, has unrevealed or stopped the reveal of the 10,000 award and now reveals a portion of a 20,000 award. The game reveals, e.g., sequentially the "2", the "20", the "20,0" and then stops as, indicated by the last two numbers in phantom line type. The game includes revealing or not revealing the commas that are commonly placed after three Arabic numerals. In FIG. 3B, the game reveals only three numbers, while in FIG. 3A the game reveals four numbers. The present invention includes revealing any portion of the award, including the entire award. As above, the paid display 100 indicates that the game has not provided an award to the player.

Figure 3C:
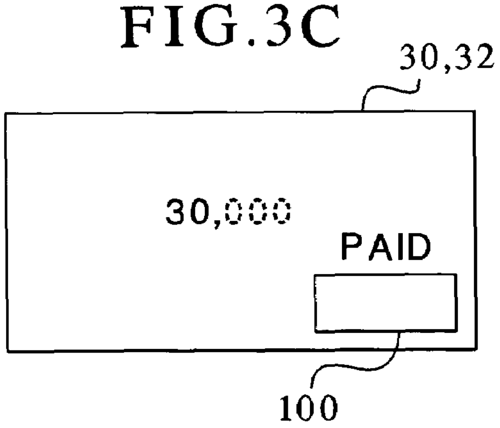

Referring now to FIG. 3C, the game, as illustrated on one of the display devices 30 or 32, has unrevealed or stopped the reveal of the 20,000 award and now reveals a portion of a 30,000 award. The game reveals, e.g., sequentially the "3", the "30" and then stops, as indicated by the last three numbers in phantom line type. The paid display 100 again indicates that the game has not provided an award to the player.

As the game sequentially reveals and unreveals awards, the game preferably increases the newly revealed awards as illustrated. In this example, the player sees "10,00", then "2,00", then "30", however, the present invention includes providing an audio broadcast from the speakers 36 (FIGS. 1A, 1B and 2), which accompanies the reveals. As the game reveals the "1000", the broadcast includes, e.g., "Congratulations, your award is 10,000, no wait a minute," then as the game reveals the "2,00", the broadcast includes, e.g., "let's increase your award to 20,000, no that's not enough," then as the game reveals the "30", the broadcast includes, e.g., "How about 30,000?, no, still too low."

Figure 3D:
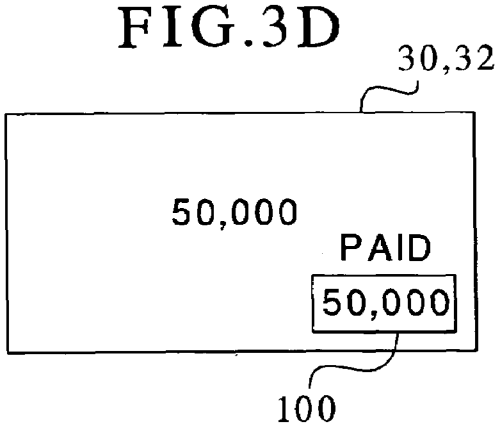

Referring now to FIG. 3D, the game, as illustrated on one of the display devices 30 or 32, has unrevealed or stopped the reveal of the 30,000 award and now finally reveals the entire 50,000 award. The game does not unreveal the final award and provides the 50,000 award to the player, as indicated by the paid display 100. In the Arabic number embodiment of FIGS. 3A to 3D, the game unreveals an award three times. The game includes any number of unreveals as described in more detail below.

Figure 4A:
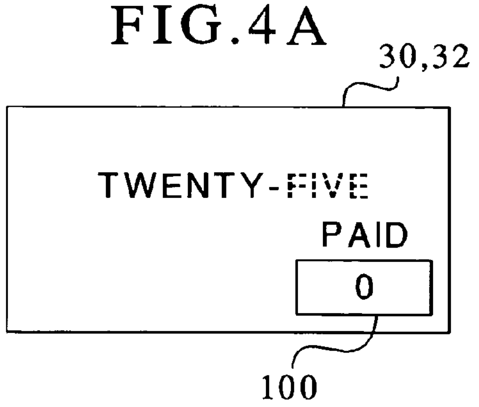
FIGS. 4A through 4E are front plan views of the display devices of FIGS. 1A and 1B, which illustrate one generic print or script embodiment of the present invention.

Referring now to FIGS. 4A through 4E, a printed or scripted award display embodiment is illustrated. In FIG. 4A one of the display devices 30 or 32 displays a portion of the award of twenty five credits in script. The word "twenty" is illustrated in solid lines while the remaining word, "five", is illustrated in phantom. As in the Arabic number embodiment, the line type differences represent that the game does not fully reveal the "twenty-five" but instead only reveals the "twenty-". The game unreveals or stops displaying the revealed portion before the game can completely reveal the award. The paid display 100 indicates that the game has yet to issue any awards to the player.

The game preferably reveals a scripted or printed award or any portion thereof in a way that is exciting and entertaining for the player. For example, the game includes revealing the award, letter by letter, from left to right. In this way the player sees word spelled out. The script or print embodiment includes coagulating words in any fashion, left to right, right to left, top to bottom, etc. The game includes making letters appear as though the word is being written. Alternatively, the game includes letters appearing from different parts of the display device 30 or 32 and moving to their appropriate space in the word.

To create excitement and enjoyment, the present invention includes revealing at least a portion of the scripted or printed number awards, clearly, such that the player is able to discern the revealed letters. Alternatively, the present invention includes changing an indiscernible award into a discernable one. For instance, the present invention includes enlarging an indiscernibly small revealed "twenty-five" until a player can read the words. The game preferably employs this type of reveal when the game reveals the entire award.

Figure 4B:
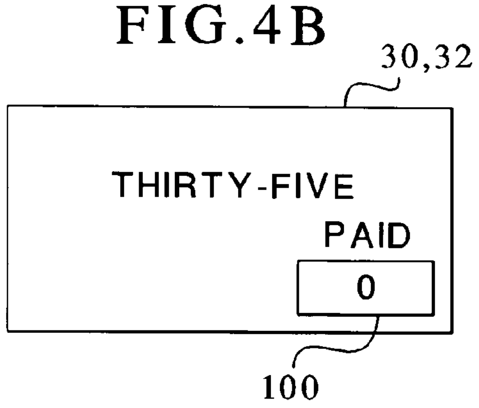
Figure 4C:
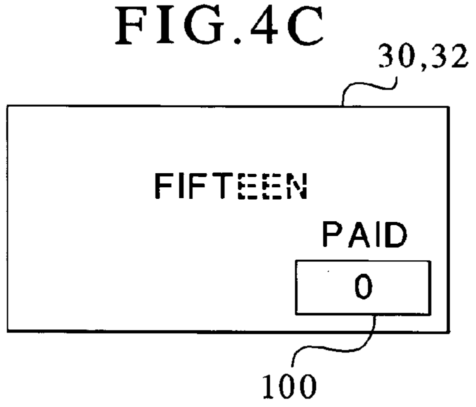

Referring now to FIG. 4B, the game, as illustrated on one of the display devices 30 or 32, has unrevealed or stopped the reveal of the twenty-five award and now reveals the thirty-five award to the player, but does not award the player thirty-five credits, as indicated by the paid display 100. Referring to FIG. 4C, the game has unrevealed or stopped the reveal of the thirty-five award and now reveals a portion of a fifteen award. The game here reveals a lesser value, fifteen, than before. The game preferably only increases a value upon a further reveal, such that the player learns to hope for unreveals. The game however includes any sequential distribution of values.

Figure 4D:
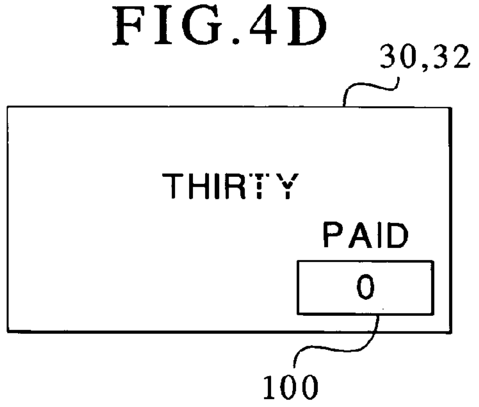

Referring now to FIG. 4D, the game has unrevealed or stopped the partial reveal of the fifteen award and now partially reveals the thirty award, sequentially, e.g., "t", then "th", then "thi", then "thir" and then stops as indicated by the last two letters "ty" in phantom line type. the scripted or printed embodiment also includes providing an audio broadcast from the speakers 36 (FIGS. 1A, 1B and 2), which accompanies the reveals. Although the FIGS. 4A through 4E illustrate the written awards in print, the present invention also includes revealing some or all the awards in scripted text.

Figure 4E:
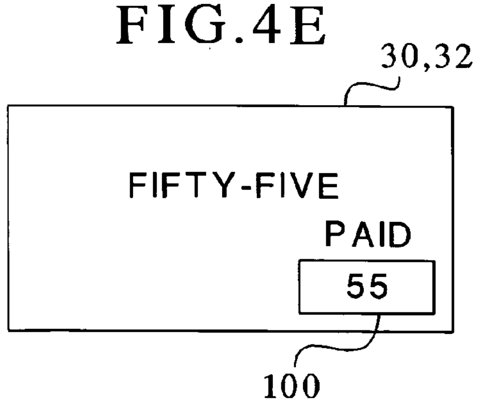

Referring now to FIG. 4E, the game, as illustrated on one of the display devices 30 or 32, has unrevealed or stopped the reveal of the thirty award and now finally reveals the entire fifty five award. The game does not unreveal the final award and provides the final award to the player, as indicated by the paid display 100. In the scripted or written award embodiment of FIGS. 4A to 4E, the game unreveals an award four times, as opposed to three unreveals in the embodiment of FIGS. 3A to 3D. The game includes any number of unreveals as described in more detail below.

Figure 5A:
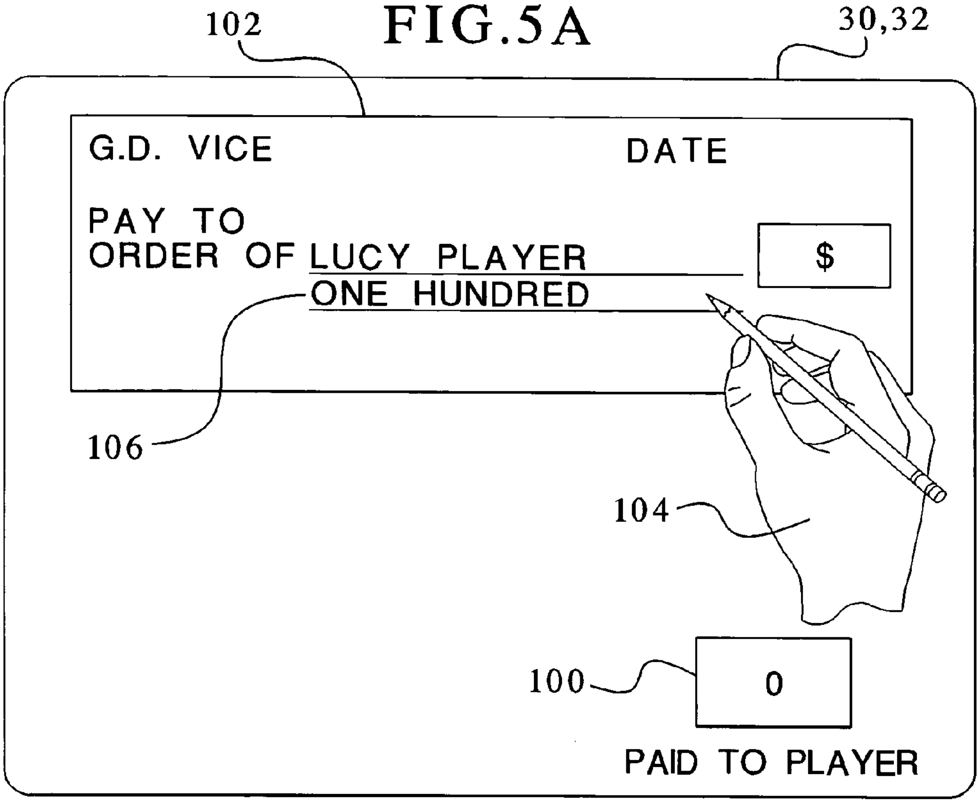
FIGS. 5A through 5C are front plan views of the display devices of FIGS. 1A and 1B, which illustrate one preferred script embodiment of the present invention.
Figure 5B:
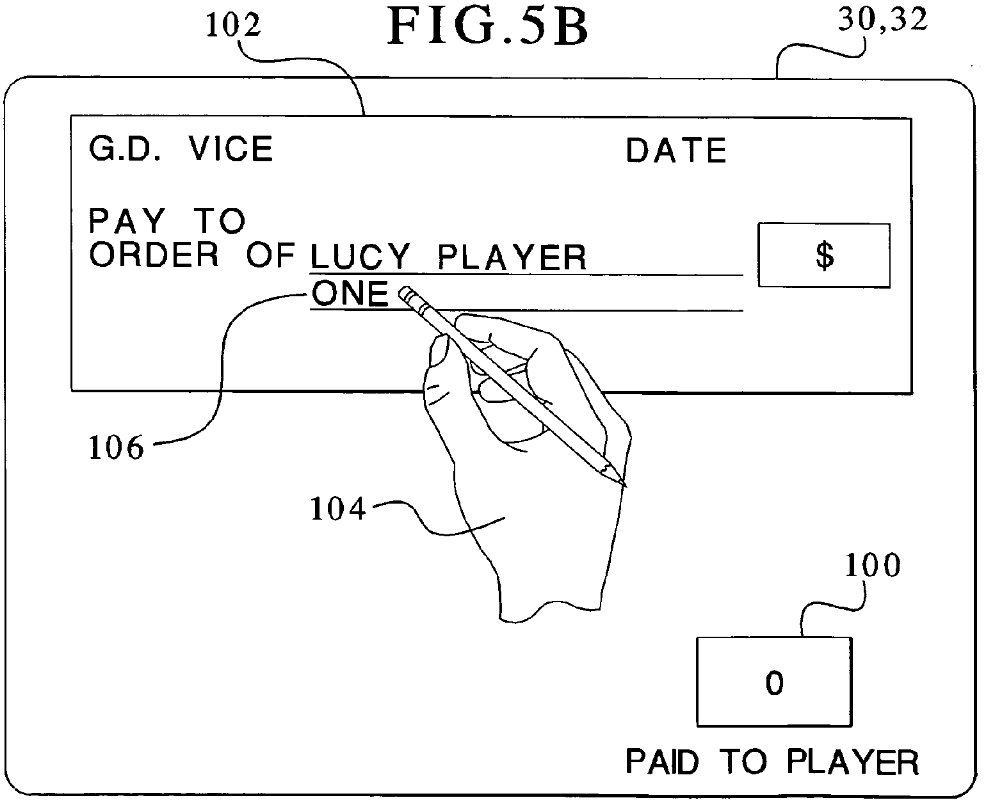
Figure 5C:
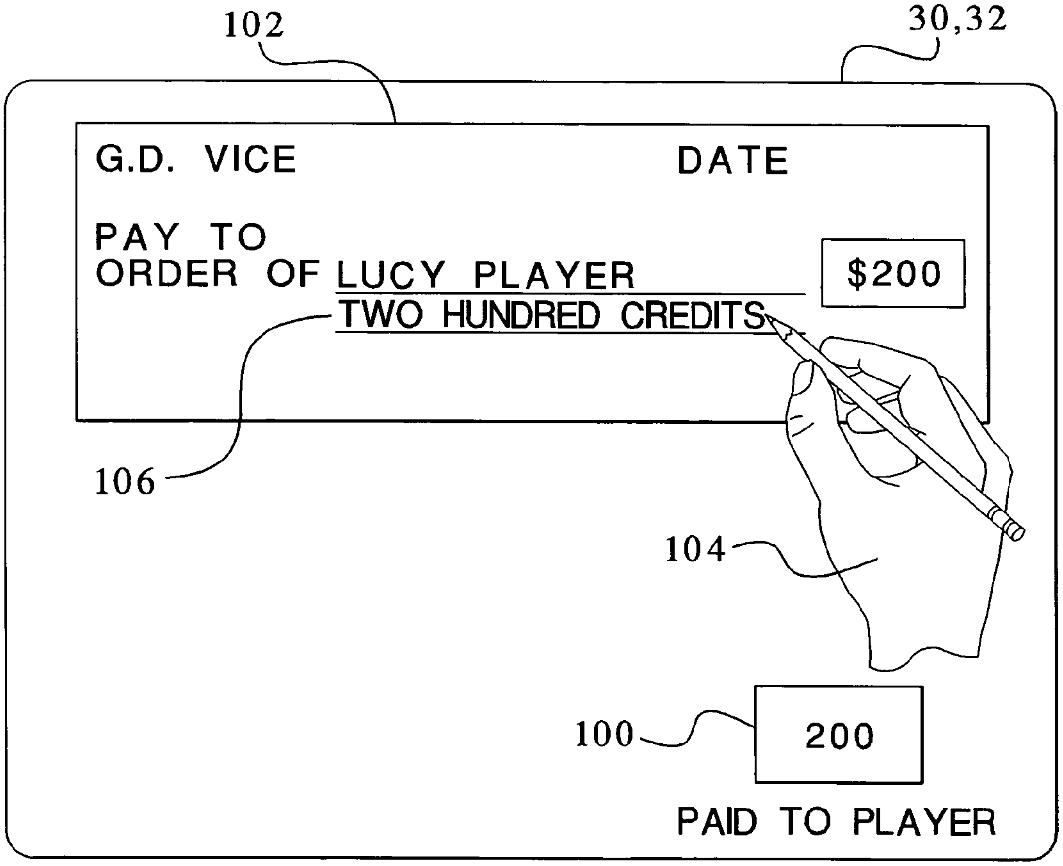

Referring now to FIGS. 5A through 5C, one preferred script or print embodiment of the present invention is illustrated on a display device 30 or 32 and includes one method of unrevealing, which involves discontinuing the award display. In FIG. 5A, an example embodiment includes an entertaining format for the revealed award such as a check 102, a reveal device such as a hand and pen 104, and a revealed award 106 such as "one hundred". It should be appreciated that the revealed award 106 includes any portion of the award or the entire award such as "one hundred fifty credits".

This embodiment includes a motion picture video display, a moving animated display or any combination thereof on one of the display devices 30 or 32. It is well known in the art to provide such displays. This embodiment also includes still pictures or still animations in combination with a motion picture or moving animated reveal sequence. In FIG. 5A, therefore, this embodiment includes a motion picture of the hand and pen, or alternatively an entire person with a pen, revealing or writing the award 106, e.g., "one hundred". This embodiment further includes a suitable audio broadcast from the speakers 36 (FIGS. 1A, 1B and 2) accompanying the reveal, wherein the person writing appears to say, e.g., "How about one hundred fifty credits." As above in FIGS. 3A through 3C, this embodiment includes partially or completely audibly revealing the award and/or partially or completely revealing the video award.

Referring now to FIG. 5B, this embodiment includes the video sequence discontinuing the display of the award 106. In the embodiments of FIGS. 3A through 3D and 4A through 4E, the game abruptly stopped displaying the revealed awards or portions thereof. In this embodiment, the motion picture shows the hand and pen 104 erasing the award 106 from the reveal format or check 102. The hand and pen 104 preferably reveals the award 106 from left to right in FIG. 5A and now erases the award from right to left in FIG. 5B. The present invention includes unrevealing all at once, left to right, right to left, top to bottom, bottom to top, center to outside, outside to center or by any other method that enhances enjoyment and excitement for the player. An accompanying audio broadcast includes, e.g., "No, no, no, that's not enough." or "No, no, no, one hundred fifty credits is not enough." That is, the audio broadcast includes or alternatively does not include the unrevealed value. As described above, a paid display 100 shows that the game has provided no credits to the player in FIGS. 5A and 5B.

Referring now to FIG. 5C, this embodiment includes the video sequence revealing another award 106 in preferably the same manner as in FIG. 5A. The second revealed award, as illustrated, is preferably larger than the first revealed award, e.g., two hundred credits. An accompanying audio broadcast includes, e.g., "Here we go, now that's better." or "Here we go, two hundred credits is more like it". That is, the audio broadcast includes or alternatively does not include the revealed value. As described above, a paid display 100 shows that the game has provided the preferably completely revealed final award of two hundred credits to the player.

In the embodiment of FIGS. 5A through 5C, the game unrevealed an award by discontinuing its display in an entertaining and enjoyable fashion. The present invention alternatively includes unrevealing by covering up a revealed award. A cover up example includes a painter who paints or reveals a new Arabic, scripted or printed award over, i.e. unreveals, a previously painted award. The player still sees at least a portion of the unrevealed award. The game clearly demonstrates, however, through the covering of the old award, and preferably through an accompanying audio broadcast, that the newly revealed award has replaced the unrevealed or covered award.

The present invention further includes unrevealing by distorting a revealed award. A distortion example again includes a painter who throws water or solvent on a revealed Arabic, scripted or printed award. The award melts, fades, splinters or morphs into an indiscernible shape. The painter paints or reveals a new award on a different area of the display device 30 or 32 or over the distorted award. The player still sees what once constituted the award, however, the distortion of the old award, a preferably accompanying audio broadcast and the revealing of a new award suitably demonstrate that the newly revealed award has replaced the distorted award.

Methods of Operation

Figure 6:
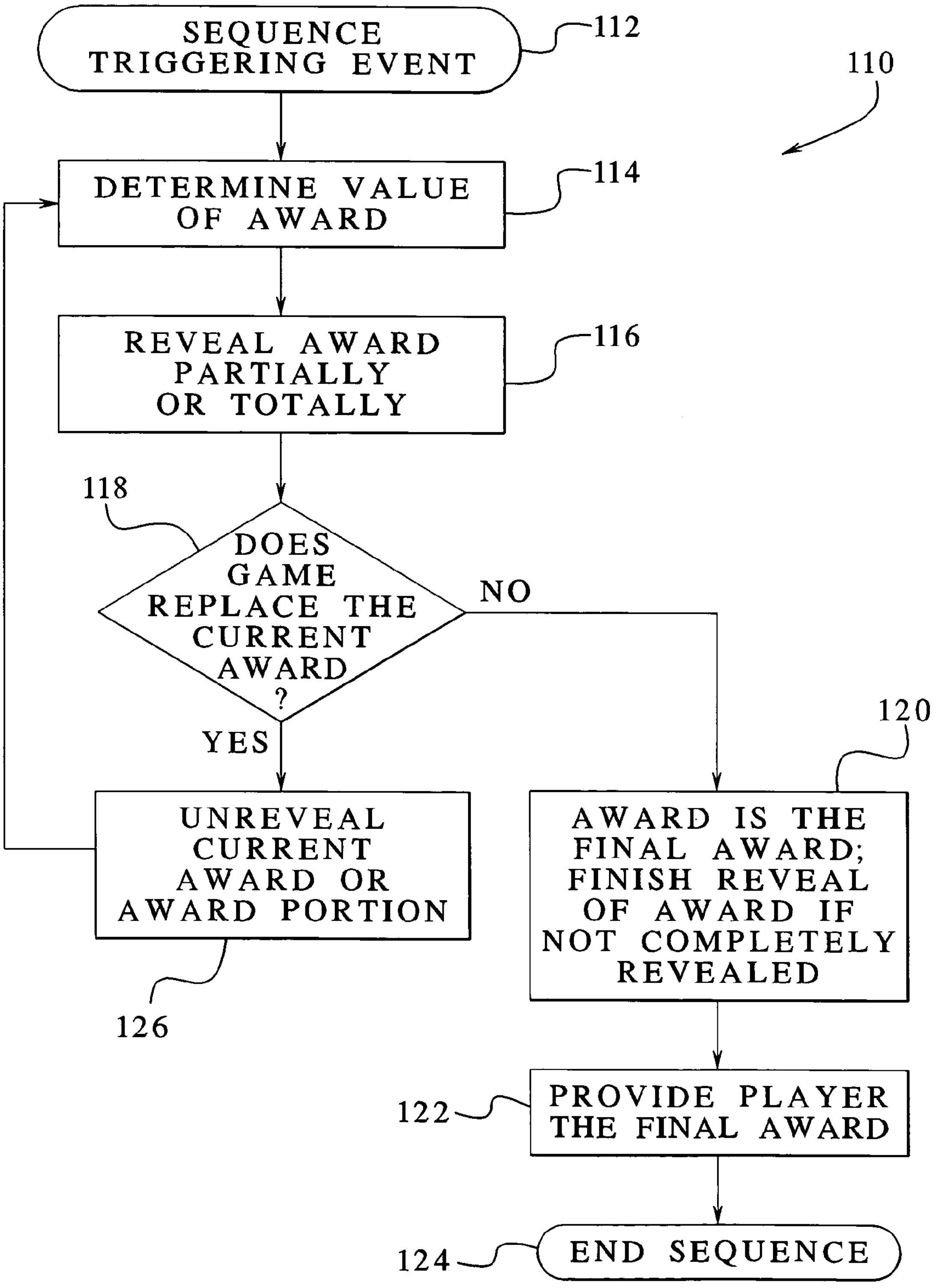
FIG. 6 is a schematic flow diagram of one embodiment of a preferred method of the present invention.

Referring now to FIG. 6, one preferred method 110 of the present invention illustrates that the game changes, increases or decreases the value of the newly revealed awards, until providing the player with the last revealed award. Upon a sequence triggering event, as indicated by oval 112, the game determines the value of an award, as indicated by block 114. In one embodiment, one of the display devices 30 or 32 initially displays a plurality of player selectable masked selections (not illustrated) which are each areas of the touch screen 50 adapted to send a discrete input to the processor 38. The sequence triggering event includes the player's choice of one of the masked selections to determine if an award will be unrevealed or fully revealed.

A preferred database structure for determining the value of an award is illustrated in FIG. 9. The game partially or totally reveals the award, as indicated by block 116 and as described in detail above. Gaming device 10 then determines whether or not to replace the currently partially or totally revealed award, as indicated by diamond 118. To make this determination, gaming device 10 employs a probability table. Two separate probability tables for determining whether to replace an award are discussed below.

If the gaming device 10 determines not to replace the current award, the gaming device: (i) sets the award to be the final award, completely reveals the final award if previously only partially revealed, as indicated by block 120; (ii) provides the final award to the player, as indicated by block 122; and (iii) ends the sequence, as indicated by oval 124. If the gaming device 10 determines that a replacement award does exist, the game: (i) unreveals the current award or portion thereof, as indicated by block 126; and (ii) determines a value for the replacement award (see FIG. 9), as indicated by block 114. In this method, the gaming device replaces current awards until the gaming device determines not to replace the current award, as indicated by diamond 118.

Figure 7:
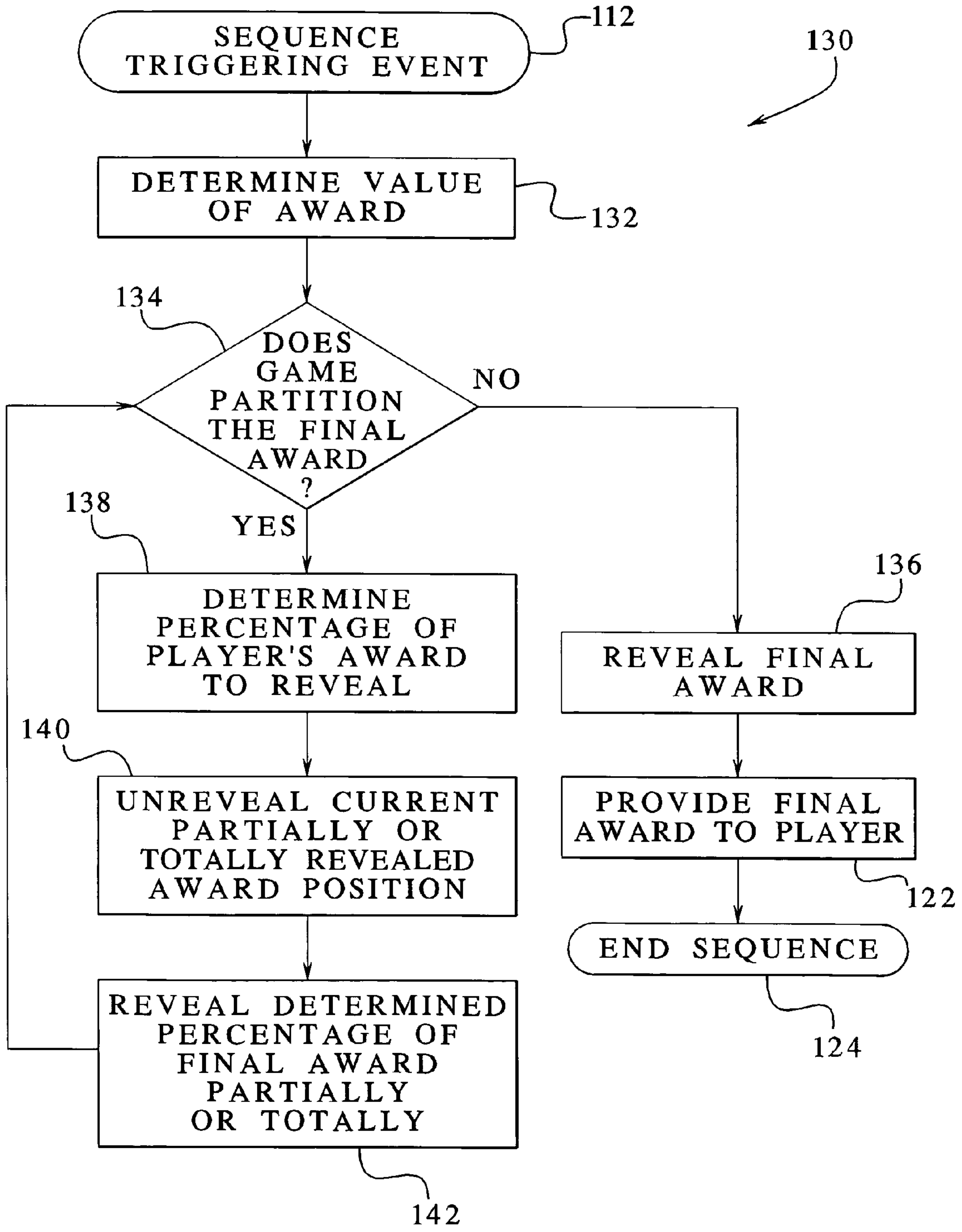
FIG. 7 is a schematic flow diagram of one embodiment of an alternative method of the present invention.

Referring now to FIG. 7, one alternative method 130 of the present invention illustrates that the game partitions a predetermined final award (instead of building an award as in method 110) into percentages and reveals the percentages until no further partitions exist. For this reason, upon a sequence triggering event, as indicated by oval 112, the game determines upfront the final award that the game ultimately provides to the player, as indicated by block 132. As before, the sequence triggering event in one embodiment is the player's choice of a masked selection from a plurality of masked selections initially displayed on one of the display devices 30 or 32. That is, this method 130 does not sequentially add to or replace an award with a higher award. This method decides an award and divides or slices the award into a varying number of pieces. The present invention includes a database which may be weighted, whereby the game randomly generates the final award and may generate one or more final awards more often than one or more other final awards if the database is weighted. Gaming device 10 determines whether to partition the final award, as indicated by diamond 134. A table for determining whether to partition the final award is discussed below in FIG. 10.

If gaming device 10 does not partition the final award, the gaming device: (i) completely reveals the predetermined final award, as indicated by block 136; (ii) provides the final award to the player, as indicated by block 122; and (iii) ends the sequence, as indicated by oval 124. If the gaming device 10 does partition the predetermined final award, the gaming device: (i) determines a percentage of the final award to reveal (see table below), as indicated by block 138; (ii) unreveals any current partially or totally revealed award partition, as indicated by block 140; (iii) reveals the determined percentage of the award, partially or totally, as indicated by block 142; and (iv) determines whether to again partition the final award, as indicated by diamond 134.

Data Tables

Referring now to FIG. 8A, one possible reveal data table 150 operates in conjunction with the method 110 of FIG. 6. The data table 150 includes a plurality of award replacements 152 having associated non-replacement percentages 154. The game employs the data table 150 in generating whether another replacement award exists, as indicated by the diamond 118 of FIG. 6. The processor 38 or computer analyzes the data table 150 such that the percentage 154 is the likelihood of not unrevealing and replacing the currently revealed award. For instance, in data table 150, there is: (i) only a 10% chance that the initially determined and displayed award is not unrevealed, i.e., that the game ends after the initially displayed award; (ii) a 25% chance that the first replacement award is not unrevealed, i.e., that the game ends after the first replacement; (iii) a 30% chance that the second replacement award is not unrevealed and replaced, i.e., that the game ends after the second replacement; and (iv) a 35% chance that the third replacement award is not unrevealed and replaced, i.e., that the game ends after the third replacement.

It should be appreciated that there is a 100% chance (addition of non-replacement percentages) that the game ends after the fourth replacement. It should also be appreciated that one of the replacements determines the player's final award. The data table 150 includes any probability distribution and any number of possible replacements. From the foregoing disclosure, one skilled in the art can readily develop similar reveal database structures.

FIG. 8B illustrates one alternative reveal data table 160 that also operates in conjunction with the method 110 of FIG. 6. The data table 150 includes a plurality of award replacements 152 having associated collect percentages 162 and continue percentages 164. The game also employs the data table 160 in generating whether another replacement award exists, as indicated by the diamond 118 of FIG. 6. The processor 38 or computer analyzes the data table 160 such that the collect percentage 162 is the likelihood of not further unrevealing and re-revealing given the current position of the player in the game and the continue percentage 164 is the likelihood of further unrevealing and re-revealing given the current position of the player in the game.

For instance, in the data table 160, there is: (i) a 10% chance that the game collects after the first replacement and a 90% that the game continues after the first replacement; (ii) if the game continues, there is a 28% chance that the game collects after the second replacement and a 72% chance that the game continues to reveal after the second replacement; (iii) if the game continues, there is a 42% chance that the game collects after the third replacement and a 58% chance that the game continues to reveal after the third replacement; and (iv) if the game continues, there is a 100% chance that the game collects after the fourth replacement; and (v) a 0% chance that the game continues to reveal after the fourth replacement.

Referring now to FIG. 9, one possible award data table 170 for operating with the method 110 of FIG. 6 is illustrated. The data table 170 includes a plurality of awards 172 having associated values 174 and generation percentages 176. The game employs the data table 170 in determining the value of an initial award or a replacement award, as indicated by block 114 of FIG. 6. For the initial award, i.e. replacement zero, the processor or computer has a 10% chance of generating the 2 award, a 25% chance of generating the 5 award, a 35% chance of generating the 10 award and a 30% chance of generating the 15 award. Upon a first replacement the game similarly randomly generates from the 20, 22, 25 and 30 awards. Upon a second replacement the game similarly randomly generates from the 35, 40, 42 and 45 awards. Upon a third replacement the game similarly randomly generates from the 50, 52, 55 and 60 awards. Upon a fourth replacement the game similarly randomly generates from the 65, 70, 72 and 80 awards.

The award data table 170 includes having any desired generation percentage distribution. The awards include having the same number of potential values (here all have four) or different numbers as desired by the implementor. The awards, as illustrated and as previously disclosed, preferably increase upon successive replacements. That is, the smallest value of the third replacement award is in one embodiment larger than the largest value of the second replacement. From the foregoing disclosure, one skilled in the art can readily develop similar award database structures.

Referring now to FIG. 10, one possible award partition data table 180 operates in conjunction with the method 130 of FIG. 7. The data table 180 includes a plurality of partitions 182 having associated reveal percentages 184 and award percentages 186 to reveal. The reveal percentages 184 determine if a reveal takes place. The award percentages 186 determine how much of the award to reveal. For example, 80% of an award of one hundred means that gaming device 10 reveals an award of eighty. The gaming device employs the data table 180 in determining whether another award partition exists, as indicated by the diamond 134, and the percentage of the award to reveal, as indicated by the block 138 of FIG. 7. The processor 38 or computer employs the data table 180 to determine intermediate reveals and not when to reveal the final award. For this reason, if at any time the gaming device 10 determines not to further partition the final award, as indicated by diamond 134 of FIG. 7, the game automatically reveals the final award, as indicated by block 136.

In the data table 180, there is: (i) an 80% chance that the game reveals 20% of the determined award; (ii) if the game continues, there is a 70% chance that the game unreveals the 20% value and re-reveals 35% of the determined award; (iii) if the game continues, there is a 60% chance that the game unreveals the 35% value and re-reveals 55% of the determined award; and (iv) if the game continues, there is a 75% chance that the game unreveals the 55% value and re-reveals 80% of the determined amount.

In the data table 180, the award percentages 186 preferably increase as the game steps through the database. The implementor includes providing any number of partitions 182 having any desired percent reveal 184 distribution and any percent of award to reveal 186 distribution, which one should appreciate, has no bearing on the player's predetermined award. The game therefore preferably includes the reveal percentages 184 being relatively high and their distribution being relatively flat. From the foregoing disclosure, one skilled in the art can readily develop similar award partition database structures.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operated under the control of a processor, said gaming device comprising:

a display device controlled by the processor;

a first award adapted to be at least partially revealed by the display device, wherein a random determination by the processor determines whether the first award is to be unrevealed by the display device, wherein said unrevealing of the first award occurs if the first award is determined to be unrevealed and after said first award is at least partially revealed by the display device, and wherein the first award is provided to a player if the determination is made that the first award is not to be unrevealed; and a second award adapted to be at least partially revealed by the display device in place of the first award if the first award is unrevealed, wherein said display device at least partially reveals said second award in place of the first award if the first award is unrevealed.

2. The gaming device of claim 1, wherein said second award is larger than said first award.

3. The gaming device of claim 1, wherein said first award and said second award have different values.

4. The gaming device of claim 1, which includes a third award at least partially revealed by the display device, wherein the third award is revealed in place of the second award if it is determined that the second award is to be unrevealed.

5. The gaming device of claim 4, which includes a fourth award at least partially revealed by the display device, wherein the fourth award is revealed in place of the third award if it is determined that the third award is to be unrevealed.

6. The gaming device of claim 4, wherein the second award is provided to the player if the processor determines that the third award is not to be revealed.

7. The gaming device of claim 5, wherein the third award is provided to the player if the processor determines that the fourth award is not to be revealed.

8. The gaming device of claim 1, wherein the processor uses award data stored in a storage device, wherein the award data represents values for the first and second awards.

9. The gaming device of claim 8, wherein the award data represents a range of values for the first award and a range of values for the second award.

10. The gaming device of claim 1, wherein said first and second awards are displayed as numbers selected from the group consisting of written numbers, scripted numbers, and printed numbers.

11. The gaming device of claim 1, which includes at least one live action video clip stored by a memory device and adapted to be displayed by the display device in connection with unrevealing the first award.

12. The gaming device of claim 1, which includes a plurality of masked selections displayed by the display device, wherein the first award is at least partially revealed upon the player's choice of one of the masked selections.

13. A gaming device operated under the control of a processor, said gaming device comprising:

a display device controlled by the processor;

a first award at least partially revealed by the display device;

a random determination by the processor of whether the first award is to be unrevealed by the display device, wherein the first award is provided to a player if the random determination is made that the first award is not to be unrevealed; and a second award at least partially revealed by the display device to replace the first award after said random determination that the first award is to be unrevealed.

14. The gaming device of claim 13, wherein said second award is larger than said first award.

15. The gaming device of claim 13, wherein said first award and said second award have different values.

16. The gaming device of claim 13, which includes a third award at least partially revealed by the display device, wherein the third award replaces the second award after a random determination that the second award is to be unrevealed.

17. The gaming device of claim 16, which includes a fourth award at least partially revealed by the display device, wherein the fourth award replaces the third award after a random determination that the third award is to be unrevealed.

18. The gaming device of claim 16, wherein the second award is provided to the player after a random determination that the third award is not to be revealed.

19. The gaming device of claim 17, wherein the third award is provided to the player after a random determination that the fourth award is not be to revealed.

20. The gaming device of claim 13, wherein award data represents a range of values for the first award and a range of values for the second award.

21. The gaming device of claim 13, which includes at least one live action video clip stored by a memory device and adapted to be displayed by the display device in connection with unrevealing the first award.

22. The gaming device of claim 13, which includes a plurality of masked selections displayed by the display device, wherein the first award is at least partially revealed upon the player's choice of one of the masked selections.

23. A gaming device operated under the control of a processor, said gaming device comprising:

a display device controlled by the processor;

a plurality of awards;

a separate probability of replacing an award associated with each of said awards;

a first award of said plurality of awards, which is at least partially revealed by the display device;

a random determination by the processor of whether the first award is to be replaced based on the probability associated with said first award, wherein the first award is provided to a player if the random determination is made that the first award is not to be replaced; and a second award at least partially revealed by the display device in place of the first award if said random determination is that the first award is to be replaced.

24. The gaming device of claim 23, which includes a third award at least partially revealed by the display device, wherein the third award is revealed in place of the second award if it is determined based on the probability associated with the second award that the second award is to be unrevealed.

25. The gaming device of claim 24, which includes a fourth award at least partially revealed by the display device, wherein the fourth award is revealed in place of the third award if it is determined based on the probability associated with the third award that the third award is to be unrevealed.

26. The gaming device of claim 25, wherein the probability associated with each subsequent award is lower than the previous award.

27. The gaming device of claim 23, wherein a plurality of the probabilities associated with the awards are different or all of the probabilities associated with the awards are different.

28. A gaming device operated under control of a processor, said gaming device comprising:

a display device controlled by the processor;

a plurality of awards;

a probability of collecting an award associated with each of said awards;

a first award of said plurality of awards, which is at least partially revealed by the display device;

a random determination by the processor of whether the at least partially revealed first award is to be collected by a player based on the probability associated with said first award, wherein the first award is provided to the player if the determination is made that the first award is to be collected by the player; and a second award at least partially revealed by the display device in place of the first award if it is randomly determined that the first award is not to be collected by the player.

29. The gaming device of claim 28, which includes a third award at least partially revealed by the display device, wherein the third award is revealed in place of the second award when it is determined based on the probability associated with the second award that the second award is not to be collected.

30. The gaming device of claim 29, which includes a fourth award at least partially revealed by the display device, wherein the fourth award is revealed in place of the third award if it is determined based on the probability associated with the third award that the third award is not to be collected.

31. The gaming device of claim 30, wherein the probability increases for each subsequent award.

32. The gaming device of claim 28, wherein a plurality of the probabilities associated with the awards are different or all of the probabilities associated with the awards are different.

33. A gaming device operated under the control of a processor, said gaming device comprising:

a display device controlled by the processor;

a plurality of awards;

a probability of revealing an award associated with each of said awards;

an award percentage associated with each of the awards, said award percentage indicating the amount of each award to reveal to a player;

a first award selected from the plurality of awards;

a random determination by the processor of whether the first award is at least partially revealed to the player based on the probability associated with said first award;

an award determination by the processor to determine the amount of the first award to reveal to the player based on the award percentage associated with said first award after it is determined that the first award is to be revealed to the player, wherein said determined amount of the first award is provided to the player after it is determined that the second award is not to be revealed to the player; and a second award at least partially revealed by the display device in place of the first award after it is randomly determined that the second award is to be revealed to the player based on the probability associated with said second award.

34. The gaming device of claim 33, which includes a third award at least partially revealed by the display device, wherein the third award is revealed in place of the second award if it is determined based on the probability associated with the second award that the second award is to be unrevealed.

35. The gaming device of claim 34, which includes a fourth award at least partially revealed by the display device, wherein the fourth award is revealed in place of the third award if it is determined based on the probability associated with the third award that the third award is to be unrevealed.

36. The gaming device of claim 35, wherein the probability decreases for each subsequent award.

37. The gaming device of claim 33, wherein a plurality of the probabilities associated with the awards are different or all of the probabilities associated with the awards are different.

38. The gaming device of claim 35, wherein the award percentage increases for each subsequent award or the award percentage decreases for each subsequent award.

39. The gaming device of claim 35, wherein the award percentage increases for each subsequent award and the probability decreases for each subsequent award.

40. The gaming device of claim 33, wherein a plurality of the award percentages associated with the awards are different or all of the award percentages associated with the awards are different.

41. A gaming device operated under the control a processor, said gaming device comprising:

a display device controlled by the processor;

a plurality of awards groups, each of said groups including a plurality of awards;

a probability of selecting an award associated with each of the awards in each of the award groups;

a first award at least partially revealed by the display device, said first award randomly selected by the processor from a first award group of said plurality of award groups based on the probabilities associated with each of the awards in said first award group, wherein the first award is provided to a player if the determination is made that the first award is not to be unrevealed; and a second award at least partially revealed by the display device to replace the first award if it is determined that the first award is to be unrevealed, wherein the second award is randomly selected by the processor from a second award group of the plurality of award groups based on the probabilities associated with each of the awards in said second award group.

42. The gaming device of claim 41, wherein a plurality of the probabilities associated with the awards in each of the award groups are different.

43. The gaming device of claim 41, wherein all of the probabilities associated with the awards in each of the award groups are different.

44. The gaming device of claim 41, wherein the awards in the second award group are larger than at least one of the awards in the first award group.

45. The gaming device of claim 41, wherein the awards in the first award group are larger than at least one of the awards in the second award group.

46. The gaming device of claim 41, wherein the awards in the first award group are different than the awards in the second award group.

47. The gaming device of claim 41, wherein all of the probabilities associated with the awards are different.

48. A gaming device comprising:

a display device;

a plurality of masked selections adapted to be displayed to a player by the display device;

a selector which enables the player to choose one of the masked selections;

a first award at least partially revealed by the display device after the player chooses one of the masked selections;

a processor operable to determine if the first award is to be unrevealed by the display device, wherein if the processor determines that the first award is to be unrevealed, the processor causes the display device to unreveal the first award, wherein the first award is provided to a player if the processor determines that the first award is not to be unrevealed; and a second award at least partially revealed by the display device if the processor determines that the first award is to be unrevealed, wherein the second award replaces the first award.

49. A method for operating a gaming device, said method comprising:

(a) at least partially revealing a first award to a player at an area of a display device;

(b) providing the first award to the player if a determination is made to not replace the first award;

(c) unrevealing said first award from the area of the display device if the determination is made to replace the first award; and (d) replacing the first award with a second award at said area of the display device by at least partially revealing the second award at said area of the display device to the player after the determination is made to replace the first award with the second award.

50. The method of claim 49, which includes randomly determining a value for the awards from award data stored by a storage device.

51. The method of claim 49, which includes repeating steps (b) through (d) at least once.

52. The method of claim 49, which includes fully revealing the second award and providing the second award to the player.

53. The method of claim 49, wherein unrevealing the at least partially revealed first award includes displaying a live action video clip.

54. The method of claim 49, wherein steps (a) to (d) are provided to the player through a data network.

55. The method of claim 54, wherein the data network is an internet.

56. The method of claim 49, wherein the determination to replace or not replace the first award is a random determination.

* * * * *